United States Patent Office 3,267,100
Patented August 16, 1966

3,267,100
ANTI-BACTERIAL-3-AMINO-6(5'-NITRO-FURYL)-1,2,4-TRIAZINES
Ralph G. Haber, 42 Kaplansky St., Givatayim, Israel
No Drawing. Filed Nov. 8, 1963, Ser. No. 322,537
Claims priority, application Israel, Nov. 16, 1962,
18,237; Oct. 24, 1963, 20,126
5 Claims. (Cl. 260—249.5)

The present invention relates to new antibacterial compositions.

The present invention consists in compositions which contain as active ingredient an asymmetric amino triazine derivative of general Formula I

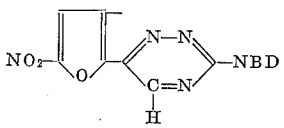

in which B and D stand each for hydrogen, lower alkyl or R'CO, R' standing for lower alkyl, or one of its non-toxic salts.

It has been surprisingly found that the compositions, according to the invention, are relatively non-toxic and have axcellent antibacterial properties against gram-positive (as good as tetracycline), gram-negative and anaerobic bacteria. Anaerobic bacteria are a great danger in open wounds and compositions which contain a substance having an antibacterial spectrum which includes such anaerobes, constitute a good material for wound dressings.

In Table I the antibacterial activity of a composition containing as active ingredient 3-amino-6-(5'-nitrofuryl)-1,2,4-triazine is shown. Table I indicates the minimal inhibitory concentration of the active ingredient in mg./100 cc. required in order to inhibit the growth of between 1 and 6 strains of each type. The measurements were carried out by the conventional tube dilution method.

TABLE I

| Strain: | mg./100 cc. |
|---|---|
| Staph. aureus | 0.025–0.1 |
| Strept. haemolit. | 0.05–0.1 |
| Shig. sonnei | 0.025–0.1 |
| Shig. flex | 0.1 |
| Salmonella | 0.05 |
| E. coli | 0.05–0.1 |
| Klebsiella | 0.1–0.5 |
| Clostr. novyi | 0.05 |

The compositions, according to the invention, may be used in veterinary as well as in human medicine.

The compositions, according to the invention, are preferably taken in the form of tablets, capsules, ampules, ointments, tinctures or solutions which are prepared by the addition of suitable binders, extenders, emulsifiers, solvents, other suitable therapeutically effective compounds and the like to a compound according to Formula I in a suitable manner.

Moreover, the new compositions may be an animal food which contains 0.001–1% of a compound of general Formula I. The compositions, according to the invention, may also be a pre-mix which is used as a feed-additive. Such pre-mix comprises preferably 1–95% of a compound of general Formula I admixed with any suitable carrier and/or feed-additive, i.e. $CaCO_3$, bentonite, soyabean meal, corn meal and the like.

The compounds of general Formula I in which at least one of the substituents B or D stands for lower alkyl or R'CO, are new.

The invention consists therefore also in the new compounds, i.e. in asymmetric amino triazine derivatives of general Formula II

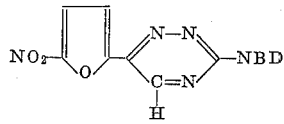

in which B, D and R' have the same meaning as in Formula I, but at least one of the substituents B and D stands for lower alkyl or R'CO, and in their non-toxic salts, and in a process for their preparation.

The compounds of general Formula II are prepared by a process, wherein a glyoxal derivative of general Formula III

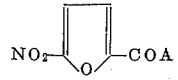

is reacted with an aminoguanidine or one of its salts of general formula IV

in which formulae A stands for CHO or $CH(OR)_2$, R standing for hydrogen, lower alkyl, benzyl or R'CO, B' and D' stand each for hydrogen or lower alkyl and R' stands for lower alkyl, with heating in an inert solvent and, if desired, the compound obtained is acylated.

The condensation reaction is preferably carried out at pH 7.5–9.0.

In connection with the present invention an inert solvent means an organic solvent or water, which is inert towards the reactants and the end product, used and obtained, respectively, in the process according to the invention. Lower alkyl alcohols, e.g. methanol are preferred inert solvents.

The invention will be illustrated by the following examples without being limited by them. All temperatures are indicated in degrees Celsius.

Example 1

18.6 g. of 5-nitrofuryl glyoxal hydrate and 500 ml. of methanol were placed in a one-liter three-necked flask, equipped with a mechanical stirrer and a reflux condenser. 13.6 g. of aminoguanidine bicarbonate were added to the clear solution obtained and the mixture was then refluxed for 30 minutes. Thereafter the mixture was cooled with ice and the precipitate obtained was filtered off to yield 15.5 g. of a brown product melting at 274–276° (decomposition). This product was dissolved in dilute hydrochloric acid, activated charcoal was added and the solution was then filtered. The clear filtrate was neutralised with a potassium bicarbonate solution and then the yellow precipitate obtained was filtered off and dried to yield 3-amino-6-(5'-nitrofuryl)-1,2,4-triazine, melting at 276–278°.

Analysis.—Calculated for $C_7H_5N_5O_3$: C, 40.57%; H, 2.43%; N, 33.81%. Found: C, 40.27%; H, 2.57%; N, 33.71%.

The product absorbed in the ultraviolet with maxima at 263 and 367 mμ. The infrared spectrum showed peaks at 2.88, 2.95 and 3.1 microns, 5.98 microns in the carbonyl region and characteristic peaks in the finger-print region. The nitrofuran group showed its characteristic peak at 13.45 microns.

*Example 2*

1 g. of 3-amino-6-(5'-nitrofuryl)-1,2,4-triazine, prepared as described in Example 1, was heated together with 10 ml. of acetic anhydride for one hour at 100°. Half of the solvent was stripped off in vacuo and the remaining solution was then poured on ice. The solid material obtained was filtered off, dried, treated with boiling acetone and the mixture obtained was filtered. The residual solid material, being 3 - (N - acetyl)-amino-6-(5'-nitrofuryl)-1,2,4-triazine, had a melting point of 266–268°. The filtrate was concentrated to a small volume and crude 3-(N-diacetyl)-amino-6-(5'-nitrofuryl)-1,2,4-triazine, M.P. 112–120°, was recovered therefrom. After recrystallisation from acetone the melting point rose to 126–127°.

3-(N-diacetyl)-amino-6-(5'-nitrofuryl)-1,2,4-triazine required a minimal inhibitory concentration against *Staph. aureus, Strept. heamolit.*, Shigella, Salmonella and *E. coli* of between 0.05 and 0.1 mg./100 cc. and against *Clostr. novyi* of 0.025 mg./100 cc.

*Example 3*

1.87 g. (0.01 mole) of 5-nitrofuryl glyoxal hydrate (M.P. 85–87°) was dissolved in 50 ml. of methanol in a three-necked flask provided wtih mixer, cooler and dropping funnel. A solution of 2.3 g. of α-methylaminoguanidine HI in 20 ml. of water, adjusted to pH 7.5, was immediately added to the above methanolic solution. The colour of the solution changed from colourless to dark yellow. The solution was refluxed for 10 minutes and then left cooling with stirring. The solution was then concentrated to half of its volume, cooled in an ice bath and the compound which precipitated was filtered off. This compound was dissolved in dilute HCl and precipitated by $Na_2CO_3$. There was obtained 1.1 g. of 3-(N-methyl)-amino-6-(5'-nitrofuryl)-1,2,4-triazine, M.P. 200–205°. After recrystallisation from acetone and nitromethane M.P. 238.5–239.5° (uncorrected).

*Analysis.*—Calculated for $C_8H_7N_5O_3$: C, 43.44%; H, 3.20%; N, 31.66%; O, 21.71%. Found: C, 43.31%; H, 3.25%; N, 31.50%, O, 21.88%.

*Example 4*

1 g. of 3-(N-methyl)-amino-6-(5'-nitrofuryl)-1,2,4-triazine, prepared as described in Example 3, was mixed with 10 ml. of acetic anhydride, the mixture obtained was refluxed for 1 hour and then left standing overnight at room temperature. Light yellow needles were obtained, which were filtered off, dried in vacuum and recrystallised from acetone/isopropanol. Obtained 0.6 g. of 3-(N-methyl-N-acetyl)-amino-6-(5'-nitrofuryl)-1,2,4 - triazine, M.P. 188.5–189°.

*Example 5*

A mixture consisting of:

| | G. |
|---|---|
| Polyethylene glycol 4000 | 200 |
| Polyethylene glycol 1500 | 200 |
| Polyethylene glycol 300 | 250 |
| Propylene glycol | 125 |
| Cetyl alcohol | 20 | was heated on a steam bath. 2 g. of finely powdered 3-(N - diacetyl)-amino-6-(5'-nitrofuryl)-1,2,4-triazine, prepared as described in Example 2, was added to the melt with efficient stirrring and after cooling, the mass obtained was passed through an ointment roller to yield a yellow ointment.

*Example 6*

100 mg. of 3-(N-methyl)-amino-6-(5'-nitrofuryl)-1,2,4-triazine, prepared as described in Example 3, was finely ground and intimately mixed with 9.9 g. of finely ground bentonite.

This pre-mix was then intimately mixed with 1000 g. of a prepared feed mixture consisting of:

| | G. |
|---|---|
| Ground corn | 200 |
| Ground sorghum | 349 |
| Soyabean meal | 340 |
| Fish meal | 15 |
| Soyabean oil | 30 |
| Alfalfa meal | 20 |
| Table salt | 4 |
| Ground limestone | 16 |
| Dicalcium phosphate | 16 |
| R9 feed additive | 10 |

The R9 feed additive consisted of:

| | | |
|---|---|---|
| Vitamin A | i.u | 7500 |
| Vitamin A | i.c.u | 900 |
| Riboflavin | mg | 5 |
| Panthothenic acid | mg | 14 |
| Niacin | mg | 22 |
| Choline chloride | mg | 400 |
| Vitamin $B_{12}$ | mg | 0.8 |
| Vitamin E | mg | 5.5 |
| Vitamin $K_3$ | mg | 2 |
| BHT | mg | 125 |
| Methionine | mg | 250 |
| Manganese | mg | 67 |
| Iron | mg | 22 |
| Copper | mg | 22 |
| Zinc | mg | 50 |
| Iodine | mg | 1.1 |
| Cobalt | mg | 0.1 |
| Bacitracin | mg | 2 |

This mixture was fed to a group of unsexed White Rock baby chicks. The average weight after 4 weeks of the chicks fed on this diet was 378 g. and that of chicks whose feed did not contain the additive, i.e. the amino trazine derivative, was 322 g.

*Example 7*

A solid mixture was prepared by intimately mixing in a Fisher-Kendall mixer: 1 g. of 3-(N-methyl)-amino-6-(5'-nitrofuryl)-1,2,4-triazine, prepared as described in Example 3, 44 g. of lactose, 5 g. of calcium carbonate and 50 g. of soyabean meal. This mixture was used as a premix for a feed additive.

*Example 8*

10 g. of 3-(N-methyl-N-acetyl)-amino-6-(5'-nitrofuryl)-1,2,4-triazine, prepared as described in Example 4, and 40 g. of lactose were mixed together. A starch mucilage binder was added in a quantity to produce a proper mass for granulation. This mass was passed through a sieve, dried at 60° and then passed again through a sieve. A small quantity of talcum and starch powder was added and from this mass tablets were pressed from a tabletting machine.

What I claim is:
1. Asymmetric amino triazine derivatives of the formula

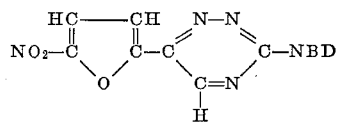

in which B and D are each a member selected from the group consisting of hydrogen, lower alkyl and R'CO, wherein R' stands for lower alkyl, at least one of B and D standing for lower alkyl or R'CO.

2. 3-(N-acetyl)-amino-6-(5'-nitrofuryl)-1,2,4-triazine.
3. 3 - (N - diacetyl) - amino-6-(5'-nitrofuryl)-1,2,4-triazine.

4. 3-(N-methyl)-amino-6-(5'-nitrofuryl)-1,2,4-triazine.

5. 3-(N-methyl-N-acetyl)-amino-6-(5'-nitrofuryl)-1,2,4-triazine.

References Cited by the Examiner

UNITED STATES PATENTS

| | | | |
|---|---|---|---|
| 3,053,734 | 9/1962 | Hogberg | 167—53 |
| 3,060,086 | 10/1962 | Kueter | 167—53 |
| 3,139,431 | 6/1964 | Haynes | 260—248 |
| 3,154,547 | 10/1964 | Huffmann | 260—249.5 |
| 3,156,690 | 11/1964 | Dexter | 260—249.5 |

FOREIGN PATENTS 909,665 10/1962 Great Britain.

WALTER A. MODANCE, *Primary Examiner.*

JULIAN S. LEVITT, *Examiner.*

NORRIS G. MANN, JOHN M. FORD,
*Assistant Examiners.*